United States Patent Office 3,418,133
Patented Dec. 24, 1968

3,418,133
EDIBLE SPREADS OF UNCTUOUS CONSISTENCY AND LOW CALORIE VALUE
Gerard J. J. Nijhoff, Nijmegen, Netherlands, assignor to Kunstzijdespinnerij Nyma N.V., Nijmegen, Netherlands
No Drawing. Continuation-in-part of application Ser. No. 297,986, July 26, 1963. This application Aug. 10, 1966, Ser. No. 571,380
Claims priority, application Netherlands, July 30, 1962, 281,523
2 Claims. (Cl. 99—1)

ABSTRACT OF THE DISCLOSURE

Edible spreads of low caloric value are prepared mainly from water, sodium carboxymethylcellulose (CMC), and relatively small amounts of taste and odor imparting ingredients. The spreads have the consistency of butter or mayonnaise when the degree of substitution of the CMC is between 0.1 and 0.6. The range of effective degree of substitution varies with the viscosity of the CMC.

---

This in a continuation-in-part of my application Ser. No. 297,986, filed July 26, 1963, now abandoned.

This invention relates to food of low calorie value, and particularly to edible spreads of low caloric content similar in consistency to mayonnaise or butter at about 20° C.

It has been found that unctuous edible spreads can be prepared from water and a small amount of an alkali metal salt of certain types of carboxymethyl cellulose, hereinafter abbreviated CMC.

CMC salts having a degree of substitution of 0.6 to 1.0 are commonly employed as stabilizers, binders and thickeners in edible unctuous mixtures, such as ice cream and salad dressings, but the CMC salts conventionally employed in the food industry are not in themselves capable of imparting the desired unctuous or oleaginous consistency to an edible material which is not itself unctuous. These CMC salts are capable only of thickening and/or stabilizing an already unctuous mixture. If components of a considerable caloric value are replaced in unctuous food products by solutions of these CMC salts, products of an objectionable taste and texture result.

An edible unctuous spread can be prepared according to this invention from water and at least 0.4 percent by weight of an alkali metal salt of CMC, if the degree of substitution of the CMC is 0.1 to 0.6. The ingredients which mainly account for the unctuous consistency of conventional edible spreads, and which have a high calorie value, may be omitted entirely. The spreads produced mainly from CMC salts and water according to this invention are plastically deformable under minimal applied pressure, but lack the resiliency which is characteristic of gels. They are shape-retaining but plastically deformable, as is characteristic of mayonnaise, butter or petrolatum at about 20° C.

The degree of substitution which limits the ability of CMC salts to form unctuous mixtures with water varies somewhat with the viscosity of the CMC, and the larger amounts of CMC salts may be necessary with relatively unfavorable combinations of viscosity and substitution than with those which more closely approach an optimum relationship of the two last-mentioned parameters.

As employed in this specification, "low viscosity CMC" is sodium carboxymethylcellulose having a viscosity of 3 to 30 cps., as determined in an aqueous 1% solution at 20° C. by means of a capillary viscometer. "Medium viscosity CMC" has a viscosity of 30 to 300 cps. under the same conditions, and "high viscosity CMC" has a viscosity of more than 300 cps. Viscosities of 1000 cps. or more were determined by the falling ball method. All types of CMC suitable for this invention are readily soluble in water to the extent necessary and the most suitable types are characterized by a steep increase in the viscosity of their aqueous solutions at room temperature as the concentration increases.

The degree of polymerization of low-viscosity CMC is 100–400, of medium viscosity CMC 400–850, and of high viscosity CMC 850–2000.

Table 1 lists the degree of substitution, the viscosity of an aqueous solution at the indicated concentration, and the conditions for forming an unctuous mixture with water at room temperature for a variety of sodium carboxymethylcellulose samples which are numbered for convenience of later reference.

TABLE 1

| No. | Average degree of substitution | Viscosity Cps. | Viscosity Percent | Conditions for unctuousness (percent +) |
|---|---|---|---|---|
| 1 | 0.05 | (¹) | 2 | None |
| 2 | 0.12 | (¹) | 2 | (²) |
| 2a | 0.15 | 13 | 2 | 7 |
| 2b | 0.32 | 10 | 2 | 5 |
| 3 | 0.39 | 12 | 2 | 5 |
| 3c | 0.45 | 11 | 2 | ³ 8 |
| 3b | 0.48 | 8 | 2 | ⁴ 10 |
| 3a | 0.50 | 10 | 2 | None |
| 4 | 0.61 | 10 | 2 | None |
| 5 | 0.12 | (¹) | 1 | None |
| 6 | 0.15 | (¹) | 1 | (²) |
| 6a | 0.20 | 40 | 1 | 4 |
| 7 | 0.24 | 260 | 1 | 3 |
| 7a | 0.28 | 212 | 1 | 3 |
| 8 | 0.41 | 290 | 1 | 3 |
| 8a | 0.50 | 147 | 1 | ³ 3 |
| 9 | 0.55 | 91 | 1 | ⁴ 3 |
| 10 | 0.60 | 72 | 1 | None |
| 11 | 0.30 | 450 | 1 | 2.5 |
| 12 | 0.36 | 19,000 | 1 | 1 |
| 13 | 0.42 | 57,000 | 1 | 1 |
| 14 | 0.49 | 42,000 | 1 | 1 |
| 14a | 0.55 | 15,000 | 1 | ³ 1 |
| 15 | 0.58 | 14,000 | 1 | ⁴ 1 |
| 16 | 0.62 | 10,000 | 1 | None |

¹ Very thin and/or unstable dispersion, no significant viscosity reading.
² Unsatisfactory because of considerable fiber content.
³ Fair.
⁴ Poor.

The CMC samples 1 to 4 in the table are of the low viscosity type, samples 5 to 10 of the medium viscosity type, and samples 11 to 16 of the high viscosity type. Within the three groups, optimum results are achieved at degrees of substitution of about 0.35–0.40. At moderately lower and higher degress of substitution, it is necessary to use more CMC, and it is impossible to produce firmly unctuous mixtures at substitution values of less than 0.1 nor more than 0.6 with any amount of CMC that can be dissolved in water at room temperature, but the precise value of the upper and lower limits varies somewhat with the viscosity of the CMC employed, as is evident from the table.

Because of low solubility, low-viscosity CMC having a degree of substitution of less than 0.1, medium viscosity CMC having a degree of substitution of less than 0.2, and high-viscosity CMC whose degree of substitution is under 0.3 are not suitable for the purpose of the invention.

The preferred limits are approximately 0.1 to 0.45 for low viscosity CMC, 0.2 to 0.5 for medium viscosity CMC, and 0.3 to 0.55 for high viscosity CMC. The minimum amount of CMC necessary for firmly unctuous edible spreads depends on the viscosity of the CMC, only 0.5% being required of the high viscosity type, 1.5% of the medium viscosity type, and 2.5% of the low viscosity type. Significant changes of viscosity imparting at least some measure of oiliness or unctuousness to water are observed with concentrations of all viscosity types as low as 0.4%. The viscosity increases rapidly with concentration of the best CMC types, as is evident in sample No. 3 whose viscosity is only 12 cps. at a concentration of 2%, but which forms an unctuous mixture with water at a concentration of 5%.

The following examples are illustrative of the preparation of unctuous foods of low calorie content according to the invention from water, a small amount of CMC meeting the requirements evident from Table 1, and other ingredients which impart to the mixture the desired taste or flavor. It will be understood that the invention is not limited to the examples.

EXAMPLE 1

Salad dressings of various thickness were prepared from the following ingredients, all percentages being by weight:

| | Percent |
|---|---|
| Vegetable oil | 6 |
| Distilled vinegar | 10 |
| Sugar | 9.4 |
| Salt | 2.2 |
| Lemon juice | 1.3 |
| Instant starch | 0.2 |
| Glycerine monostearate | 1.1 |
| Algin | 0.3 |
| Monosodium glutamate | 0.01 |
| Mustard powder | 0.1 |
| Sodium carboxymethyl cellulose | 1.3–5 |
| Water (balance) | 68.09–64.39 |

The CMC was dissolved in a part of the water which varied with the solubility of the CMC type employed. The starch and alginate were dispersed in the remainder of the water, and the two aqueous liquids were combined. The glycerine monostearate and the vegetable oil were added next, whereupon the other ingredients followed. The mixture was ultimately homogenized.

Salad dressings having the characteristic shape retaining properties and spreading behavior of good mayonnaise were prepared with the following types of CMC identified by numbers in Table 1 in the concentrations indicated.

| CMC No.: | Concentration, percent |
|---|---|
| 3 | 5 |
| 7 | 3.5 |
| 8 | 2.5 |
| 12 | 2 |
| 13 | 1.3 |
| 14 | 1.3 |

Somewhat less satisfactory shape retention was achieved when using CMC Nos. 9 (2.5%) or 15 (1.3%). Thick masses which did not retain their shape but flowed readily under the influence of gravity were obtained from CMC Nos. 3a (10%), 10 (2.5%), and 16 (1.3%), and from the CMC samples listed in Table 2.

TABLE 2

| Average degree of substitution | Viscosity | | Concentration in dressing, percent |
|---|---|---|---|
| | Cps. | Percent | |
| 0.61 | 10 | 2 | 10 |
| 0.7 | 7 | 2 | 15 |
| 0.6 | 15 | 2 | 10 |
| 0.7 | 68 | 1 | 3 |

EXAMPLE 2

Spreadable mixtures closely similar to butter in their mechanical characteristics, appearance and consistency, though pale in color, were prepared from equal amounts of margarine and aqueous CMC solutions. The types of CMC employed and their concentrations in the aqueous solutions are listed below.

| CMC No.: | Concentration, percent |
|---|---|
| 3 | 5 |
| 7 | 3 |
| 8 | 3 |
| 12 | 1 |
| 13 | 1 |
| 14 | 1 |

The spreads so prepared had only one-half of the calorie content of the margarine, and contained CMC in a concentration of one-half of that listed above.

The ratio of margarine and CMC solution could be varied over a wide range without unfavorably affecting the spreading characteristics of the unctuous mixture.

EXAMPLE 3

A pastry cream was prepared from

| | Percent |
|---|---|
| Sugar | 15 |
| Whole milk powder | 10 |
| Vegetable oil | 9 |
| CMC | 0.7–4.5 |
| Water | balance |

The amount of CMC employed varied with the viscosity of the CMC chosen in a manner obvious from Example 2. One kilogram of the cream was prepared by stirring the sugar, the milk powder, and the oil into 300 ml. water in this order, separately dissolving the CMC in the remainder of the water, and mixing the two liquids. The types of CMC employed were those listed in Example 2.

The creams produced were soft, yet shape retaining. The products prepared in an analogous manner from CMC having a degree of substitution higher than 0.6 were viscous but did not retain their shape against the forces of gravity.

EXAMPLE 4

A chocolate-flavored cream of very low calorie content was prepared from the following ingredients:

| | Percent |
|---|---|
| Cocoa powder | 6.3 |
| Sodium cyclamate | 4.0 |
| Vanilline | 0.1 |
| Potassium sorbate | 0.01 |
| Sodium benzoate | 0.1 |
| CMC solution | 89.49 |

The CMC was dissolved in the water, and the other ingredients were mixed with each other and gradually stirred into the aqueous solution. The mass obtained was agitated or kneaded until it was homogeneous. The CMC types employed and their concentrations in the aqueous solution were as follows:

| CMC No.: | Concentration, percent |
|---|---|
| 2a | 12 |
| 2b | 10 |
| 3 | 10 |
| 6a | 5.5 |
| 8 | 4.5 |
| 8a | 4.5 |
| 11 | 3.5 |
| 13 | 2.5 |
| 14a | 2.5 |

The several creams produced were shape-retaining, soft masses of pleasant taste and consistency. Only very viscous liquids could be obtained by the use of CMC types Nos. 4 (10%), 10 (4.5%) and 16 (2.5%).

EXAMPLE 5

An orange flavored spread to replace marmalade, but practically without nutrient value, was prepared from the following ingredients:

| | Percent |
|---|---|
| Orange flavoring (paste) | 3 |
| Sodium cyclamate | 2 |
| Sodium benzoate | 0.1 |
| Citric acid (10% solution) | 4.9 |
| CMC solution | 90 |

The CMC was first dissolved in water, and the other ingredients were admixed with stirring in the order indicated above. Unctuous spreads were obtained with solutions of the CMC types listed below having the indicated concentrations:

| CMC No.: | Concentration, percent |
|---|---|
| 2b | 9.5 |
| 3 | 9 |
| 7 | 4.6 |
| 8 | 4.4 |
| 12 | 2.9 |
| 13 | 2.9 |
| 14 | 2.9 |

Only viscous liquids were obtained with CMC Nos. 4 (11%), 10 (5%), 16 (3%). An attempt to produce an unctuous spread by even further increasing the amount of CMC of higher degree of substitution yielded gummy gels of unpleasant consistency.

EXAMPLE 6

A fruit dessert almost without calorie value was prepared from the following ingredients:

| | Grams |
|---|---|
| Natural strawberry juice | 450 |
| Sodium cyclamate | 9 |
| Sodium benzoate | 1 |
| CMC solution | 500 |
| Citric acid solution (12.5%) | 40 |

The sodium cyclamate and sodium benzoate were dissolved in the strawberry juice, and the solution was combined with the CMC solution. The citric acid solution was added last.

An unctuous product of pleasant taste was obtained when the CMC solution contained 9.6% CMC No. 7a or 7.7% CMC No. 14. Tough and resilient masses were obtained when enough CMC of a degree of substitution of 0.6 or higher was used to make the product shape retaining.

The cyclamate could be replaced by 150 g. sugar when the CMC solution was limited to 350 g. and products of the desired consistency were obtained with the CMC types of the invention.

What is claimed is:
1. An edible spread of unctuous consistency consisting mainly of an effective amount of a food ingredient, water, and at least 0.4% by weight of an alkali metal salt of carboxymethyl cellulose having a degree of substitution between 0.1 and 0.6,
   (1) the amount of said salt being sufficient to make said spread shape-retaining, yet plastically deformable by low stresses, substantially as butter or mayonnaise at 20° C.,
   (2) said spread being free of significant elasticity,
   (3) the amount of said water being sufficient to disperse said salt,
   (4) said degree of substitution being between 0.1 to 0.45 when the viscosity of said salt is between 3 and 30 cps. in aqueous 1% solution at 20° C.,
   (5) said degree of substitution being between 0.2 and 0.5 when the viscosity of said salt is between 30 and 300 cps. in aqueous 1% solution at 20° C., and
   (6) said degree of substitution being between 0.3 and 0.55 when the viscosity of said salt is greater than 300 cps.

2. A spread as set forth in claim 1, wherein said alkali metal is sodium.

References Cited

UNITED STATES PATENTS

| 3,023,104 | 2/1962 | Battista | 99—1 |
| 2,190,445 | 2/1940 | Ellsworth. | |
| 2,358,549 | 9/1944 | Wenck | 195—100 |

OTHER REFERENCES

Whistler, R. L.: Industrial Gums, 1959, Academic Press, New York, pp. 648–654.

Hollabaugh et al.: "Industrial and Engineering Chemistry," October 1945, pp. 945 relied on.

MAURICE W. GREENSTEIN, *Primary Examiner.*

U.S. Cl. X.R.

99—123; 260—231